Aug. 5, 1958  D. G. HUGLEY ET AL  2,845,951
PRESSURE REGULATING MEANS
Filed Aug. 30, 1954  2 Sheets-Sheet 1
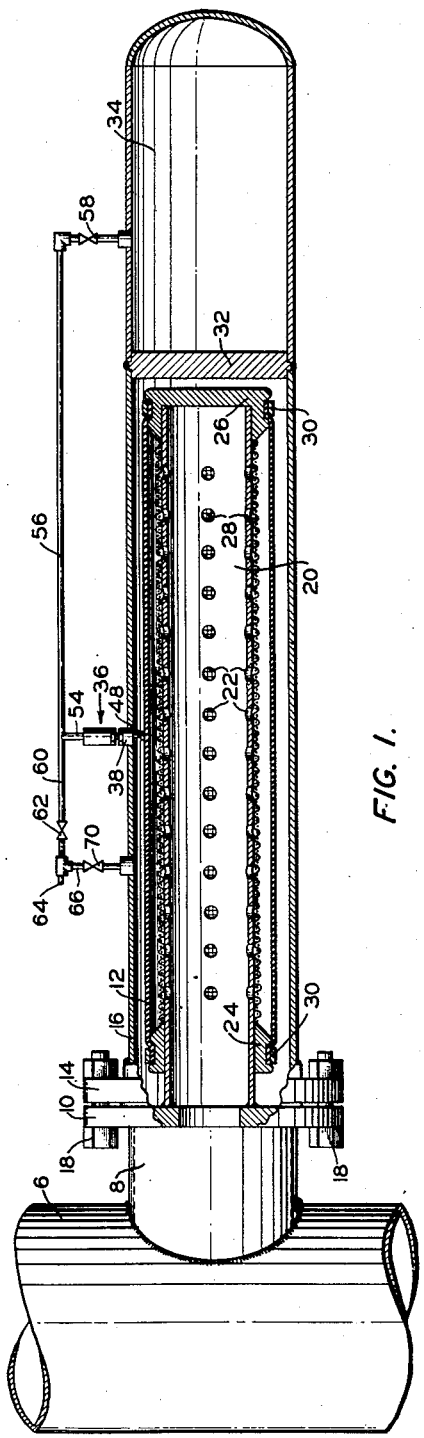
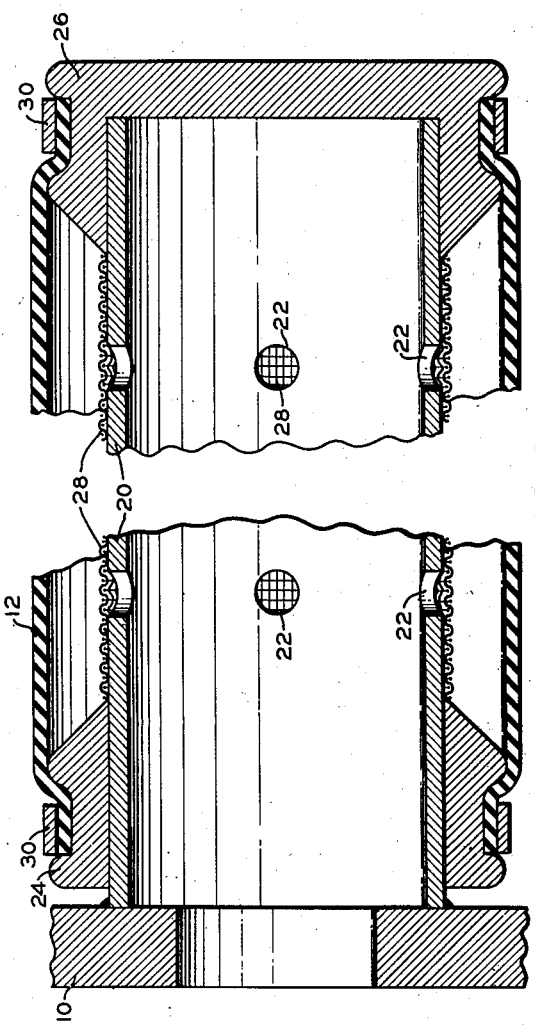
INVENTORS.
DALE G. HUGLEY
HARRY M. WYATT
BY
*John H. Widdowson*
ATTORNEY Aug. 5, 1958     D. G. HUGLEY ET AL     2,845,951
PRESSURE REGULATING MEANS Filed Aug. 30, 1954     2 Sheets-Sheet 2

INVENTOR.
DALE G. HUGLEY
HARRY M. WYATT
BY
John H. Widdowson
ATTORNEY

United States Patent Office 2,845,951
Patented Aug. 5, 1958

2,845,951
PRESSURE REGULATING MEANS
Dale G. Hugley, Wichita, Kans., and Harry M. Wyatt, Tulsa, Okla.
Application August 30, 1954, Serial No. 452,980
5 Claims. (Cl. 138—30)

This invention relates to method and means for regulating pressure. In a more specific aspect, this invention relates to method and means of decreasing the pressure fluctuation of the fluid in a conduit, for example as a result of being pumped. In a still more specific aspect, this invention relates to controlled withdrawal of a portion of fluid from a conduit when such fluid is subjected to relatively high pressure and reintroduction of the withdrawn fluid into the conduit when the conduit fluid is subjected to relatively low pressure. In yet another specific aspect, this invention relates to new pressure surge elimination means having a pressure surge chamber utilizing a new and advantageous principle. And, in still another specific aspect, this invention relates to new valve means to be employed with a pressure surge chamber to result in new combination apparatus to eliminate variation of pressure of a fluid in a conduit which is subjected to fluctuating pressure.

Devices to eliminate pressure surge of fluids in conduits subjected to fluctuating pressure by pumping means are known in the art, and pressure surge chambers utilizing an elastic or flexible diaphragm therein to zone such chambers are known in the art. These elastic or flexible rubber or rubber-like diaphragms separate the compressible fluid or gas in the chamber from line fluid. They are impervious to the line fluid and prevent the gas in its zone of the surge chamber from diffusing into the line fluid. All suitable elastic or flexible diaphragm materials have optimum operating characteristics, and if stretched beyond the optimum operating position, the diaphragm tends to be overstressed causing failure. The optimum operating position of the flexible diaphragm is within those limits of travel which give maximum pressure surge elimination with minimum stress, strain and damage of the diaphragm material. The flexible diaphragms of the pressure surge eliminators of the prior art devices tend to rupture with changing of average line pressure on the transfer fluid conduit because the volume of gas in the compression chamber of the pressure surge eliminator changes. The pressure surge eliminators of the prior art either maintain a constant pressure on the compressible fluid side of the diaphragm or the pressure times volume quantity stays constant on the compressible fluid side of the diaphragm, which results in excessive flexing of the diaphragm. We have found that regulation of the surge chamber volume occupied by the compressible fluid therein within limits so that the diaphragm will flex only through its optimum distance of travel results in very adequate pressure surge control of the line fluid and long and maximum life of the flexible diaphragm within the pressure surge chamber of the control means.

We have invented a method of regulating pressure variation of a fluid in a conduit which comprises passing a portion of the fluid on pressure increase into a first zone maintained at a regulated volume by passing a compressible fluid into a second zone separated from the first zone by a diaphragm in response to increase in volume of the first zone. The new method of our invention decreases the rate of volume increase of the first zone and the rate of pressure increase on the fluid in the conduit. Our new method and means limits the volume change of the first zone and thus the amount of diaphragm deformation. New preferred apparatus of our invention comprises a chamber divided into zones by a diaphragm. One of the zones is adapted to be placed in fluid communication with the conduit. A conduit is in fluid communication with the other of the zones in the chamber and a supply of compressible fluid. This conduit has a valve therein which is adapted to be operated upon extension of the diaphragm to pass a compressible fluid into the last-named zone of the chamber to cease the extension of the diaphragm, the diaphragm having been extended by passage of the line fluid into the chamber upon pressure increase. The new valve means of our invention which is operatable by contact with a diaphragm upon its extension comprises a valve body with a passageway therethrough. Means within the valve body is operatable to open and close the passageway. The valve has a stem projecting from the body and is adapted in its inner end portion to operate the means which opens and closes the passageway. The valve is adapted to open upon extension of the diaphragm in contact with the portion of the valve stem which projects from the valve body to open the passageway through the valve body. The valve means particularly advantageously adapts itself to adjustable mounting in the wall of a pressure surge chamber, the stem of the valve projecting into the chamber so that it may be contacted by the diaphragm upon its extension or displacement as a result of line fluid entering the proper zone in the surge chamber.

The new method and means of our invention has many advantages. It has been found that our new surge removal method and apparatus operates at maximum efficiency regardless of the line pressure. A smaller pressure surge chamber is required than those devices of the prior art for the same job, resulting in saving of material and labor. The life of the separating diaphragm in the pressure surge chamber means of our invention has been found to be increased materially because it operates at minimum stress. It has been found possible to use lighter and thinner diaphragms, thus effecting a saving of material. The new apparatus of our invention is easy and economical to manufacture, and it operates efficiently and is economical and easy to maintain and repair when necessary.

It is an object of this invention to provide a new method and means for regulating pressure.

It is another object of this invention to provide new method and means for decreasing the pressure surge on a fluid in a conduit which is subject to fluctuating pressure, for example as a result of pumping such fluid.

It is a further object of our invention to provide new valve means.

It is another object of this invention to provide new valve means for use with pressure surge chambers having an elastic or flexible diaphragm therein, such valve means being operatable on extension of said diaphragm to admit a compressible fluid to regulate the volume of the compressible fluid zone within said pressure surge chamber.

Other objects and advantages of the new pressure regulating method and means of our invention will become apparent to one skilled in the art upon reading this disclosure.

Drawings accompany and are a part of this disclosure. Such drawings depict preferred specific embodiments of our invention, and it is to be understood that such drawings are not to unduly limit the scope of our invention.

In the drawings, Fig. 1 is a longitudinal elevation view partly cut away and partly in cross section depicting preferred specific pressure surge elimination means of our invention, wherein it is preferred to carry out the new pressure surge elimination method of our invention.

Fig. 2 is an enlarged longitudinal cross section view broken in its central portion of the inner diaphragm supporting and mounting means preferably utilized in our invention and depicted in Fig. 1.

In Fig. 3 the valve means is in closed position.

Figures 3, 4:
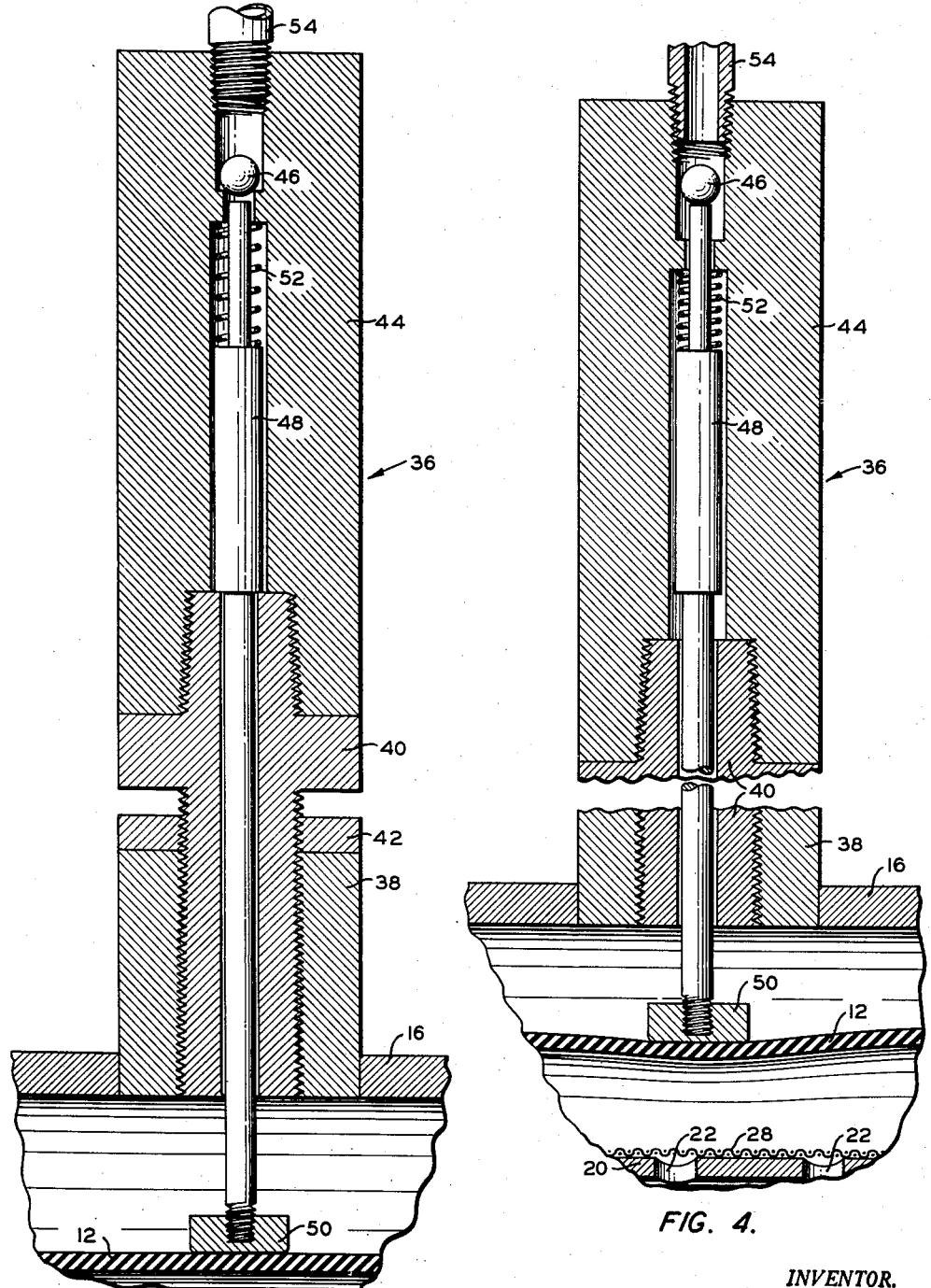
Fig. 3 is a longitudinal elevation view in cross section of preferred valve means of our invention preferably utilized in the new surge chamber of our invention depicted in Figs. 1 and 2.
Fig. 4 is a longitudinal elevation view in cross section of the valve means depicted in Fig. 3, but in open position.

Following is a discussion and description of our invention made with reference to the drawings whereon the same reference numerals are used on the same parts or structure. The discussion and description is of preferred specific embodiments of our invention, and it is to be understood that such is not to unduly limit the scope of our invention.

Pipe 6 carries the line fluid which is subjected to fluctuating pressure, for example, as a result of being pumped by a piston type pump or a lift pump such as those commonly used in pumping crude oil wells. A section of pipe 8 is connected to and communicates with pipe 6. Such pipe 8 can conveniently be welded to pipe 6. A flange 10 which mounts flexible diaphragm 12 and its supporting means is secured to the outer end of pipe section 8 in any suitable manner, threaded securement having been found convenient, it being easy to remove same for repair, change, etc., if necessary or desired. Flange 14 which mounts the outer housing 16 of the pressure surge chamber of our invention is secured to flange 10 by bolt and nut assemblies 18. Gasket means, not shown, can be used to seal between flanges 10 and 14, and in use with hydrocarbon fluids, it has been found desirable that such gasket be oil resistant. In connection herewith, it has been found desirable to make diaphragm 12 of oil resistant rubber-like material such as Buna-N, Neoprene, and the like, Buna-N which is a copolymer of butadiene and acrylonitrile being preferable.

The flexible diaphragm 12, which divides the surge chamber of our invention into a first zone within diaphragm 12 and a second zone between diaphragm 12 and housing 16, and the mounting and supporting means for diaphragm 12 is attached to and mounted on flange 10. A perforated hollow cylindrical member 20 is attached to flange 10 in any suitable manner such as by welding and is in free fluid communication with pipe 8 and main line conduit 6 through a centrally located aperture in flange 10. Member 20 is perforated with holes 22 so that line fluid can pass freely therethrough to the space between member 20 and diaphragm 12. A collar member 24 having a groove therearound is mounted on the inner end portion of member 20, and a similar member 26 is mounted on the outer end of member 20, member 26 closing the end of tubular member 20 as well as providing a circumferential groove. Such members 24 and 26 are preferably mounted so that fluid passes out of member 20 into the space between same and diaphragm 12 only through holes 22. Wire mesh or screening 28 surrounds member 20 and covers holes 22 therethrough. This screen 28 supports diaphragm 12 when the diaphragm comes in contact with the screen to prevent the diaphragm from being forced into holes 22, thus possibly being ruptured. Bands or clamps 30 hold the ends of diaphragm 12 in the grooves of members 24 and 26. Diaphragm 12 is impervious to the line fluid in line 6 and within pipe 8 and inside diaphragm 12. Also, the diaphragm 12 is impervious to the diffusion therethrough of the gas which is normally within the zone between the diaphragm and outer cylinder housing 16 of the surge chamber.

Housing 16 is connected to flange 14 in any suitable manner such as by welding. A partitioning member 32 is welded to the outer end of member 16 and separates tank 34 from member 16, tank 34 also being mounted on member 32 in any convenient manner, such as by welding. Tank 34 can be a continuation of housing 16 which is partitioned therefrom, if desired.

A valve generally designated as 36 is mounted in housing 16. This valve has an attachment portion 38 which can conveniently be inserted in a hole in member 16 and welded thereto. An adjustable portion 40 is threadedly secured in member 38 and held in place therein at a desired position by lock nut 42. The upper end portion of adjustable member 40 is threadedly secured to the valve body 44 wherein is located the valve seat. A ball 46 rests on the seat of the valve when the valve is closed, as shown in Fig. 3. The valve stem 48 extends through members 44 and 40 into the zone of the surge chamber between diaphragm 12 and housing 16. Valve stem 48 fits loosely in members 44 and 40, so that there is an annular passageway therearound forming the outlet of the valve. A button 50 is secured to the inner end of valve stem 48. Diaphragm 12 contacts this button 50 to operate the valve stem and valve during operation of the surge chamber. A spiral spring 52 is mounted around the upper end portion of valve stem 48 within member 44 and urges valve stem 48 out of contact with ball 46, the upper end of member 40 governing the lowered position of valve stem 48. When diaphragm 12 extends to contact button 50, valve stem 48 is raised against the pressure of spring 52 to lift ball 46 from the valve seat and open the valve as shown in Fig. 4. Conduit 54 is threadedly secured to the upper inlet end of the valve body, and communicates with a conduit 56 which in turn communicates with tank 34, which has a supply of compressible fluid or gas therein under a pressure greater than line pressure in conduit 6 and within diaphragm 12. Conduit 56 preferably has a valve 58 therein so that tank 34 can be isolated from the system, if desired. A conduit 60 with a valve 62 therein communicates with conduit 56, such being used to charge tank 34 with compressible fluid, when desired, and a plug 64 is usually and desirably installed after tank 34 has been charged with the operating gas. A line 66 with a valve 70 therein communicates between conduit 60 and the zone between member 16 and diaphragm 12 in the surge chamber, this line 66 being used to precharge the surge chamber with gas, or to withdraw gas therefrom, if desired.

The preferred operation of the surge chamber device of our invention is as follows. Tank 34 is charged with gas at a sufficiently high operating pressure greater than line 6 pressure by the use of conduits 60 and 56. After charging, valve 62 is closed and valve 58 is maintained in open position. Also, valve 70 is closed, and it has been found desirable to insert plug 64, if the apparatus is operated in the field. As set forth hereinbefore, line 66 can be used to partially charge the surge chamber with operating gas, preferably nitrogen, or other inert gas, and the same operating gas with which tank 34 is charged. Upon an increase of pressure on line fluid in line 6, some of such line fluid will flow through pipe 8 into member 20 out through holes 22 and screen 28, and flexible diaphragm 12 will extend to increase the volume of the zone in the surge chamber within diaphragm 12 and decrease the rate of increase of the pressure in line 6. The zone in the surge chamber between diaphragm 12 and housing 16 decreases in volume and increases in pressure. When diaphragm 12 extends, it contacts button 50 raising valve stem 48, which unseats ball 46 and opens the valve. Gas then passes from tank 34 through conduit 56 down around valve stem 48 and into the surge chamber to increase the quantity of gas therein and decrease the rate of extension of diaphragm 12 and the rate of increase of the volume of the zone within diaphragm 12. Upon this operation, the desired quantity of operational gas is introduced into the surge chamber. Upon a decrease in pressure on the fluid in line 6, the pressure within diaphragm 12 is directly decreased and elastic diaphragm 12 retracts to decrease the volume of the zone therein and to increase the pressure on the fluid in line 6. Diaphragm 12 will then extend opposite to its extension on pressure increase, prevented from entering holes 22 which might rupture diaphragm 12 by screen 28. On the next pressure increase of the fluid in line 6, diaphragm 12 will extend again, but will not open the valve 36 unless extension of diaphragm 12 is enough and greater than before, with the exception of the case where some of the operating gas has escaped from the surge chamber.

We have found it desirable that our equipment be designed so that the volume of the zone within diaphragm 12 remain during operation within the range of 75 to 125 percent of its volume when said diaphragm is in unextended position. As an example of our method and means, the surge chamber can be used to eliminate pressure surge of crude oil and salt water being pumped through a conduit from a well on which the surge is from 0 to 250 pounds per square inch gauge with an average of 50 pounds per square inch gauge without our surge eliminating device. Our surge elimination means can be used to maintain the line pressure in the range of 46¼ to 53¾ pounds per square inch gauge. In the device the maximum extension of the diaphragm is such that the volume of the zone within the diaphragm 12 is from 75 to 125 percent of its volume when the diaphragm is in unextended position.

As will be evident to those skilled in the art, various modifications of our invention can be made, or followed, in the light of this disclosure and discussion, without departing from the spirit or scope of the disclosure or from the scope of the claims.

We claim:

1. Apparatus for decreasing the range of pressure variation of a fluid in a conduit for same and subject to fluctuating pressure comprising, in combination, a chamber, an elastic diaphragm impervious to said fluid mounted within said chamber and separating same into a first zone and a second zone, said first zone being in free fluid communication with said conduit, a conduit communicating with said second zone and a supply of gas under a pressure greater than said fluid pressure, a valve having a valve body in said last-named conduit, said valve having a ball seatable on the valve seat thereof to close said valve, a valve stem projecting through the wall of said chamber into said second zone contactable with said diaphragm with its inner end portion and said ball with its outer end portion, a spring mounted in said valve body to urge said valve stem out of contact with said ball, an annular passageway formed by said valve stem and body to permit passage of said gas into said second zone when said valve is open and said body of said valve adjustably mounted in the wall of said chamber to allow for adjustment of said stem in relation to said diaphragm, and said diaphragm operatively mounted in said chamber to extend upon introduction of said fluid into said first zone from said first-named conduit to increase the volume of said first zone and to contact said valve stem to open said valve for said passage of said gas into said second zone to cease said extension of said diaphragm.

2. Apparatus for regulating pressure variation of a fluid in a conduit for same comprising, in combination, a chamber, an elastic diaphragm mounted within said chamber and separating same into a first zone and a second zone, said first zone being in free fluid communication with said conduit, a container of compressible fluid under pressure, a conduit communicating with said second zone at a point remote from said container and said container of compressible fluid under pressure, a valve in said last-named conduit, said valve having operating means contactable with said diaphragm in value operating relation to upon extension of said diaphragm open said valve to pass said compressible fluid into said second zone, and said diaphragm operatively mounted in said chamber to extend upon introduction of said first-named fluid into said first zone from said first-named conduit to increase the volume of said first zone and to contact said valve operating means to open said valve for said passage of said compressible fluid into said second zone to cease said extension of said diaphragm.

3. Apparatus for regulating pressure variation of a fluid in a conduit for same, comprising, in combination, a chamber, a diaphragm in said chamber separating same into a first zone and a second zone, said first zone being in communication with said conduit, a container of compressible fluid, a conduit communicating with said second zone at a point remote from said container and said container of compressible fluid, valve means in said last-named conduit, said valve means being responsive to the extension of said diaphragm to open said valve means for passage of said compressible fluid into said second zone, and said diaphragm operatively mounted in said chamber to extend upon introduction of said first-named fluid into said first zone from said first-named conduit to increase the volume of said first zone and to actuate said valve means to allow for said passage of said compressible fluid into said second zone to cease said extension of said diaphragm.

4. Valve mechanism for use to pass a fluid in a conduit into one zone of a chamber separated into at least two zones by an elastic diaphragm which comprises, in combination, a valve body mountable in the wall of said chamber, said valve body in a portion outside said wall of said chamber when mounted adapted to receive said conduit, said valve body adjustably mountable in said wall of said chamber to make the valve seat of said valve variably positionable in relation to said wall of said chamber and said elastic diaphragm therein, a ball seatable on said valve seat of said valve to close said valve, a valve stem slidably mounted in said valve body and projecting therefrom, said stem projectable through said wall of said chamber to be contacted by said diaphragm with its outer end portion and said stem mounted and positioned to contact said ball with its inner end portion, a spring mounted within said valve body and around said stem urging said valve stem out of contact with said ball, an annular passageway in said valve body around said valve stem formed by said stem and valve body and forming the outlet passageway of said valve and adapted to permit passage of said compressible fluid through said valve when said valve is open, said stem having an enlarged portion engageable with said valve body to limit travel of said stem, said spring engaging said valve body and said enlarged portion, and said valve operable to be opened by an extending diaphragm in contact with said valve stem.

5. Apparatus for regulating pressure variation of a fluid in a conduit for same, comprising, a chamber, a diaphragm in said chamber separating same into two zones, one of said zones openly connectable with said conduit, a container of compressible fluid, conduit means connectable to the other of said zones at a point remote from said container and said container of compressible fluid, and valve means in said conduit means, said valve means being operatively responsive to extension of said diaphragm to open said conduit to allow for passage of compressible fluid into said last-named zone, and said diaphragm operatively mounted in said chamber to extend upon introduction of fluid from said first-named conduit into said first-named zone to increase the volume thereof and to actuate said valve means to allow for said passage of compressible fluid into said other of said zones to limit said extension of said diaphragm.

References Cited in the file of this patent

UNITED STATES PATENTS

| 737,984 | White | Sept. 1, 1903 |
| 1,135,579 | Hansen | Apr. 13, 1915 |
| 1,589,288 | Hansen | June 15, 1926 |
| 2,405,734 | Coe | Aug. 13, 1946 |
| 2,609,001 | Hebard | Sept. 2, 1952 |
| 2,659,391 | Berger | Nov. 17, 1953 |

FOREIGN PATENTS

| 684,319 | Great Britain | Dec. 17, 1952 |